United States Patent
Castracane

(10) Patent No.: US 6,701,036 B2
(45) Date of Patent: Mar. 2, 2004

(54) MIRROR, OPTICAL SWITCH, AND METHOD FOR REDIRECTING AN OPTICAL SIGNAL

(75) Inventor: James Castracane, Albany, NY (US)

(73) Assignee: The Research Foundation of State University of New York, Albany, NY (US)

(*) Notice: Subject to any disclaimer, the term of this patent is extended or adjusted under 35 U.S.C. 154(b) by 234 days.

(21) Appl. No.: 09/811,843

(22) Filed: Mar. 19, 2001

(65) Prior Publication Data
US 2002/0131681 A1 Sep. 19, 2002

(51) Int. Cl.[7] .............. G02B 6/26; G02B 6/42
(52) U.S. Cl. .............. 385/18; 385/16; 385/17; 359/858; 359/877; 250/227.11
(58) Field of Search ............. 385/18, 16; 359/858; 250/227.11–227.31

(56) References Cited

U.S. PATENT DOCUMENTS

| 5,206,497 A | * | 4/1993 | Lee ............... 250/201.1 |
| 5,661,591 A | | 8/1997 | Lin et al. ........... 359/290 |
| 5,835,257 A | | 11/1998 | Itoh et al. ........... 359/324 |
| 6,025,950 A | | 2/2000 | Tayebati et al. ....... 359/244 |
| 6,094,293 A | | 7/2000 | Yokoyama et al. ...... 359/280 |
| 6,154,302 A | | 11/2000 | Yagi et al. ........... 359/198 |
| 6,316,762 B1 | * | 11/2001 | Argast et al. ......... 250/214 R |
| 6,444,976 B1 | * | 9/2002 | Ishikawa et al. ....... 250/229 |
| 6,600,849 B2 | * | 7/2003 | Ducellier et al. ...... 385/17 |
| 6,610,974 B1 | * | 8/2003 | Hunt et al. ........... 250/227.22 |
| 6,643,425 B1 | * | 11/2003 | Bowers et al. ......... 385/18 |
| 2002/0075553 A1 | * | 6/2002 | Orcutt ................ 359/290 |
| 2002/0118909 A1 | * | 8/2002 | Weis .................. 385/18 |
| 2002/0181838 A1 | * | 12/2002 | Cunningham et al. ..... 385/16 |

FOREIGN PATENT DOCUMENTS

| DE | 3137835 | 5/1982 | ......... G01V/9/04 |
| JP | 04256382 | 11/1992 | ......... H01S/3/00 |
| WO | WO 01/81880 | 11/2001 | ......... G01J/3/42 |

* cited by examiner

Primary Examiner—Brian Healy
Assistant Examiner—Daniel Petkovsek
(74) Attorney, Agent, or Firm—Heslin Rothenberg Farley & Mesiti P.C.

(57) ABSTRACT

An optical switch for redirecting an optical signal includes a plurality of spaced-apart mirrors disposed in an array for detecting and reflecting one or more optical signals. The mirrors include a reflective member and a sensor. Desirably, the optical signal is detected by the sensor and used for triggering drive means for orientating the mirrors in the array for redirecting the optical signal.

27 Claims, 5 Drawing Sheets

MIRROR, OPTICAL SWITCH, AND METHOD FOR REDIRECTING AN OPTICAL SIGNAL

FIELD OF THE INVENTION

The present invention relates generally to optical switches, and more specifically, the present invention relates to micro-electro-mechanical system (MEMS) based optical switches.

BACKGROUND OF THE INVENTION

Certain classes of MEMS-based optical switches include an array of electrically-controlled, micro-machined "mirrors" which are used to alter the path of an optical signal. Such mirrors can be used to create reconfigurable optical networks wherein one or more optical signals from one or more source fibers are directed to any one of several destination fibers via operation of the mirrors.

Typically, in a MEMS-based optical switch, each mirror is pivotally supported about an axis and movable between a first position in which the optical signal is allowed to travel past the mirror, and a second position in which the mirror is angled to redirect the optical signal.

A controller is connected to the optical switch in a control loop fashion to send electrical signals to the optical switch to control the orientations of the mirrors in the array to properly redirect the optical signals.

There is a need for further improvements in optical switches.

SUMMARY OF THE INVENTION

In a first aspect, the present invention provides a mirror for use in an optical switch for redirecting an optical signal. The mirror includes a reflective member for reflecting the optical signal, and an optical sensor for detecting the optical signal.

In a second aspect, the present invention provides an optical switch for redirecting an optical signal. The optical switch includes a plurality of such above-noted mirrors disposed in an array.

In a third aspect, the present invention provides an optical switch for redirecting an optical signal in which the optical switch includes a mirror comprising a reflective member for reflecting the optical signal and a sensor for detecting the optical signal, and drive means for orienting the reflective member based on the optical signal.

In a fourth aspect, the present invention provides a method for redirecting an optical signal. The method includes providing a mirror having a reflective member for reflecting the optical signal and a sensor for detecting the optical signal, and orienting the mirror based on the optical signal.

In a fifth aspect, the present invention provides a method for redirecting an optical signal in which the method includes providing an optical switching signal based on the optical signal, providing a mirror having a reflective member for reflecting the optical signal and a sensor for detecting the optical switching signal, and orienting the mirror to reflect the optical signal based on the optical switching signal.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of the preferred embodiments and the accompanying drawings in which:

DETAILED DESCRIPTION OF THE INVENTION

Figure 1:
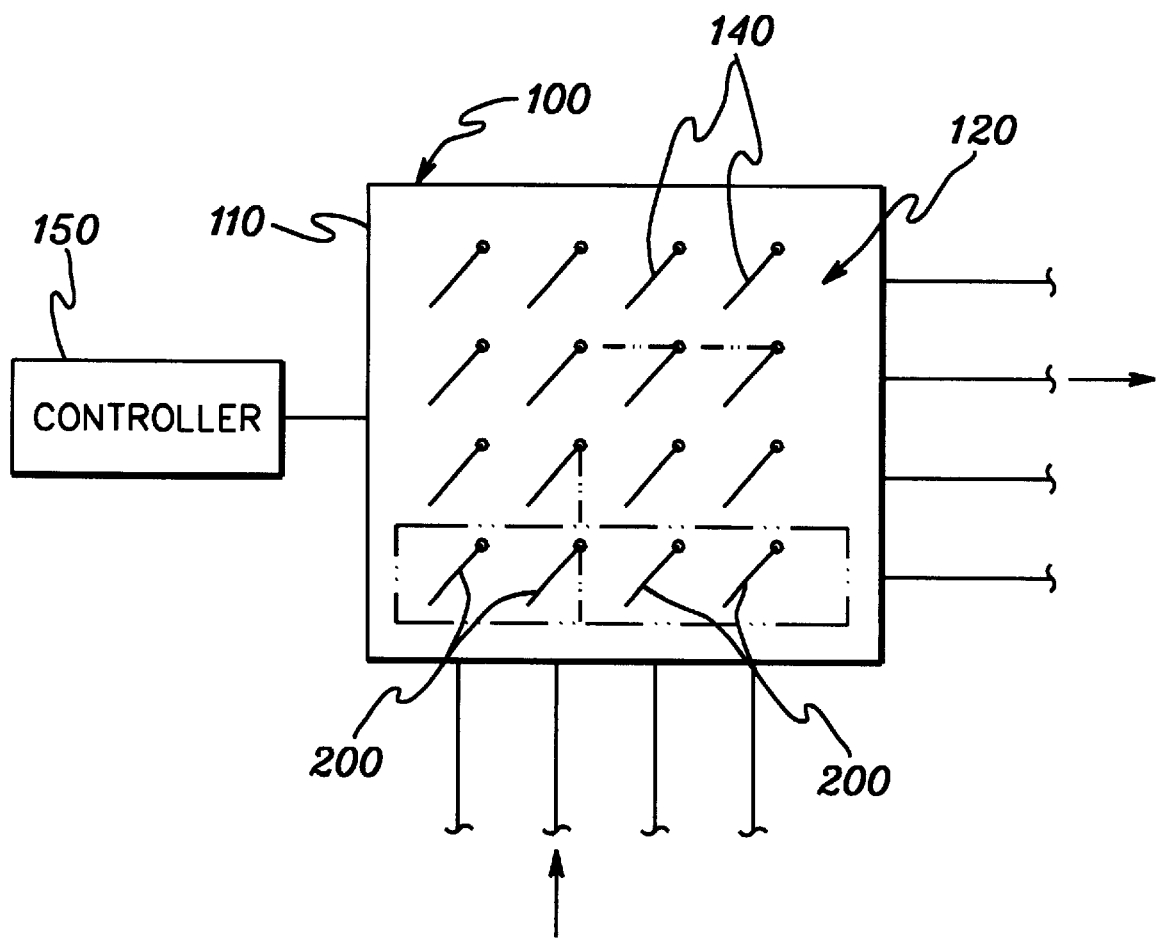
FIG. 1 is a schematic diagram of a first embodiment of an optical switch according to the present invention.

FIG. 1 illustrates one embodiment of an optical switch 100 according to the present invention for redirecting an optical signal, e.g., a coded message by means of light rays. Optical switch 100 generally comprises a housing 110 in which is supported a plurality of spaced-apart mirrors 120 disposed in an array for detecting and reflecting one or more optical signals. Housing 110 and the plurality of mirrors 120 are desirably formed using micro-electro-mechanical systems (MEMS) technology. For example, U.S. Pat. No. 6,094,293 issued to Yokoyama, et al. discloses an optical switch formed using micro-electro-mechanical systems (MEMS) technology, the entire subject matter of which is incorporated herein by reference.

In this illustrated embodiment, a portion of the plurality of mirrors 120 initially encounter an incoming optical signal and are each generally designated reference number 200 in FIG. 1.

Figure 2:
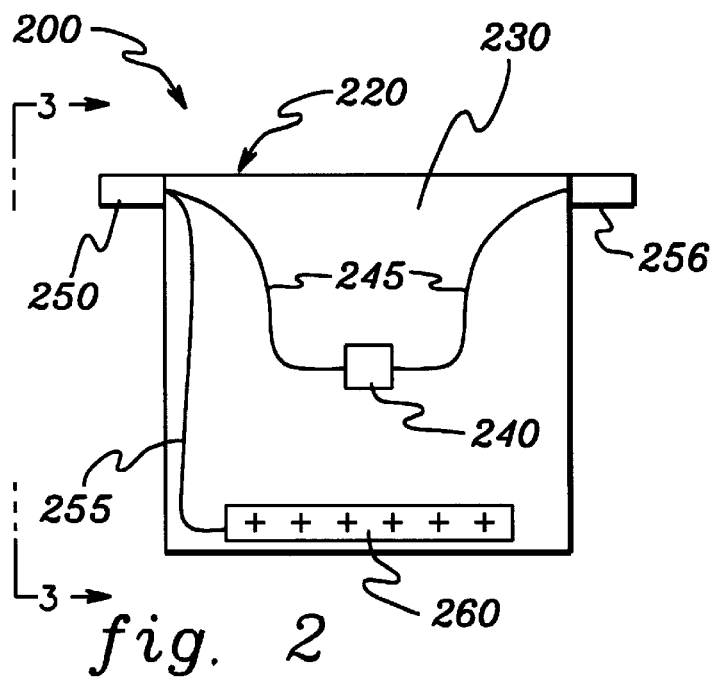
FIG. 2 is an enlarged view of one embodiment of a mirror, shown in FIG. 1, according to the present invention.
Figure 3:
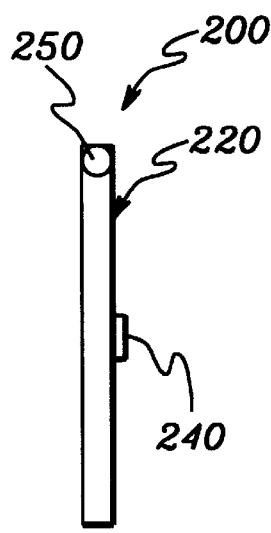
FIG. 3 is a view taken in the direction of arrows 3—3 of FIG. 2.

As best shown in FIGS. 2 and 3, mirror 200 includes a reflective member 220 for reflecting the optical signal, and an optical sensor 240 disposed on a reflective side 230 of reflective member 220 for detecting the incoming optical signal. For example, reflective member 220 may be formed of a silicon material upon which a reflective material such as aluminum or gold is disposed. Reflective member 220 may include a pair of outwardly extending beams 250 which support, e.g., suspended in air, reflective member 220 within housing 110 and which provides an axis of rotation for reflective member 220. It will be appreciated that the reflective member may be suitably configured for pivoting about two or more axes.

Sensor 240, for example, may comprise a semiconductor diode that produces, as a result of the absorption of photons, a photovoltage or free carriers that support the conduction of photocurrent, to detect the optical signal as described in greater detail below. For instance, sensor 240 may comprise a light absorptive semiconductive material such as silicon, and comprise layers (not shown) of silicon doped to a selected conductivity (i.e., n-type or p-type). A suitable insulating material may also be disposed between the reflective material and the sensor. Desirably, the sensor is formed using micro-electro-mechanical systems (MEMS) technology and integrally formed with the reflective member as one-piece. The signal detected by sensor 240 is transmitted via lead lines 245 to beams 250 and then to a controller 150 as described in greater detail below.

While sensor 240 is illustrated as being disposed on a central portion of reflective member 220 as shown in FIG. 2, it will be appreciated that a sensor may be located at other locations on the reflective member. In addition, it will be appreciated that the sensor may be a thin film coating which is deposited over substantially the entire surface area of the reflective side of the reflective member.

With reference again to FIG. 1, mirrors 120 are initially disposed in a biased orientation or biased position, e.g., at about a 45-degree angle relative to the direction of the incoming optical signal and the direction of the outgoing optical signal. Mirrors 120 are also movable and positionable in either a first position, e.g., vertically disposed position, and a second position, e.g., horizontally disposed position, as respectively illustrated in phantom in FIG. 1. Means for driving the mirrors may incorporate electrostatic means wherein a charge such as a positive charge is applied via beam 250 and a lead line 255 to an electrode 260 disposed along an edge of reflective member 240 for interaction with one or more electrodes (not shown) disposed in housing 110. Such electrostatic or other suitable mechanical, electrical, optical means (e.g., wherein the reflective member deforms upon absorption of optical energy), or combinations thereof may be equally employed for driving the reflective member, and are well known in the art.

Figure 4:
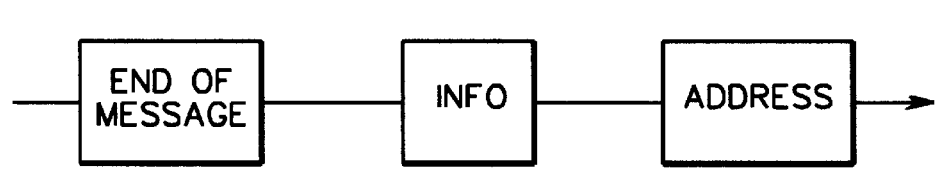
FIG. 4 is a diagrammatic illustration of an optical signal.

Optical switch 100 shown in FIG. 1 is operable for redirecting an optical signal such as, for example, an optical signal shown in FIG. 4. The optical signal may include an address portion, an information portion, and an end of message portion. In operation, optical switch 100 includes one of mirrors 200 for detecting the address portion of the incoming optical signal. The detected address portion is then processed in controller 150 which subsequently triggers the drive means of certain of the mirrors in optical switch 100 for redirecting the optical signal. Controller 150 may be integrally formed with the housing and may be reprogramable to allow changes in the detection and redirection of optical signals.

Figure 5:
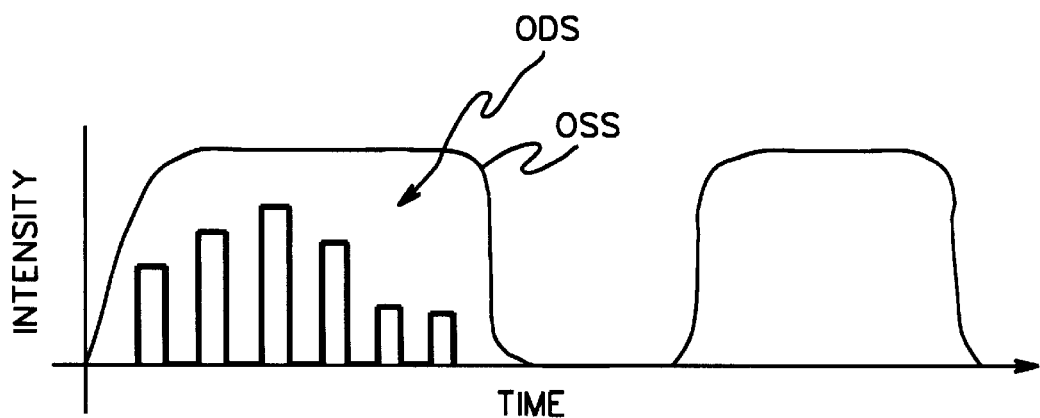
FIG. 5 is a diagrammatic illustration of another optical signal.

FIG. 5 illustrates another example of an optical signal, e.g., a modulated high frequency signal at about 100 MHz or greater, on top of which or superimposed thereon is a low frequency, e.g., about a few KHz, optical switching signal OSS for use in orienting the mirrors. With such a signal, mirrors 200 are operable to detect the optical switching signals, and in combination with controller 150 and the drive means to control the orientations of the various mirrors to redirect the optical signal.

Figure 6:
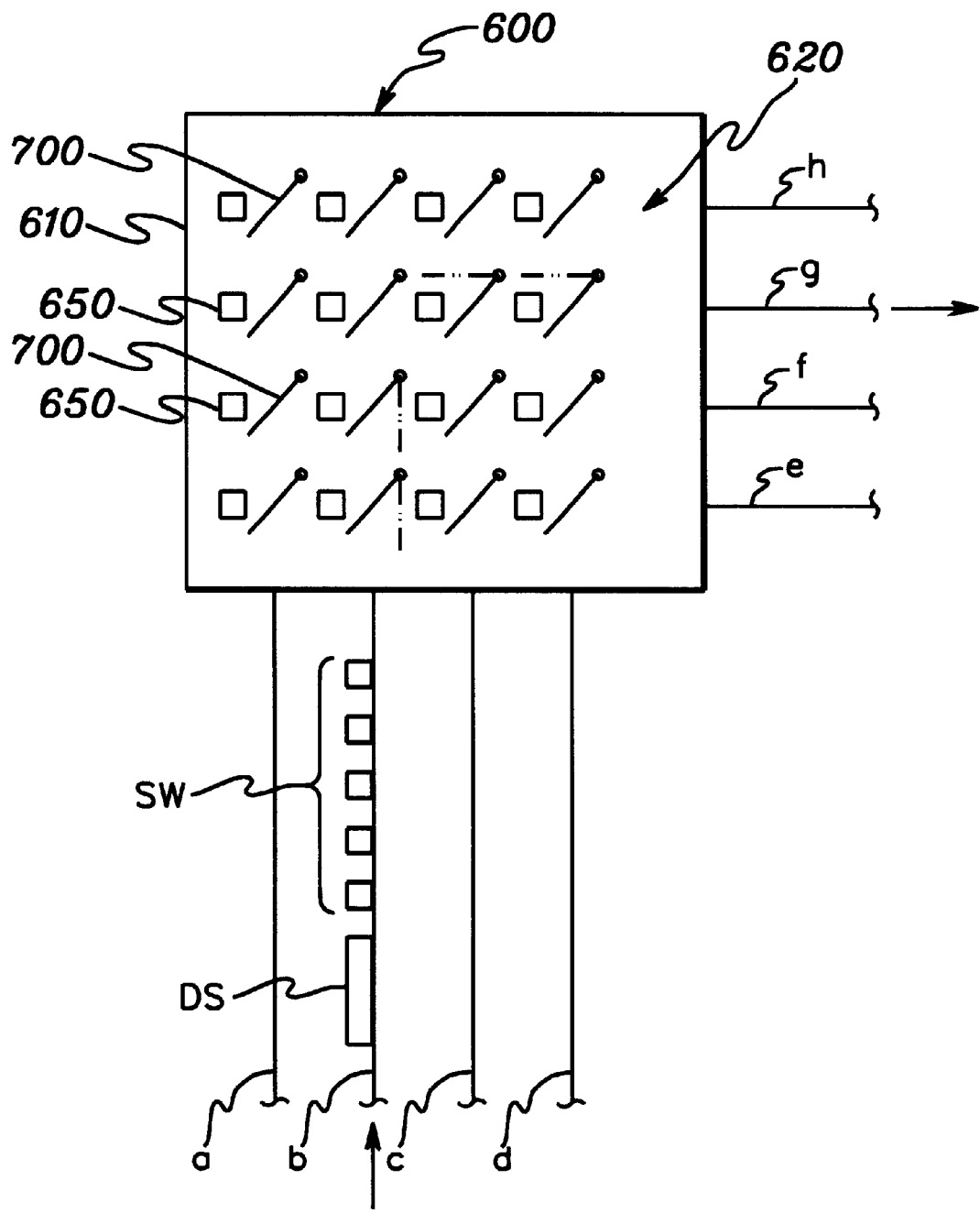
FIG. 6 is a schematic diagram of another embodiment of an optical switch according to the present invention.

FIG. 6 illustrates another embodiment of an optical switch 600 according to the present invention for redirecting an optical signal. In this illustrated embodiment, optical switch 600 generally comprises a housing 610 in which is supported a plurality of spaced-apart mirrors 620 disposed in an array for detecting and reflecting one or more optical signals. Housing 610 and the plurality of mirrors 620 are desirably formed using MEMS technology, and include drive means as discussed above.

Figure 7:
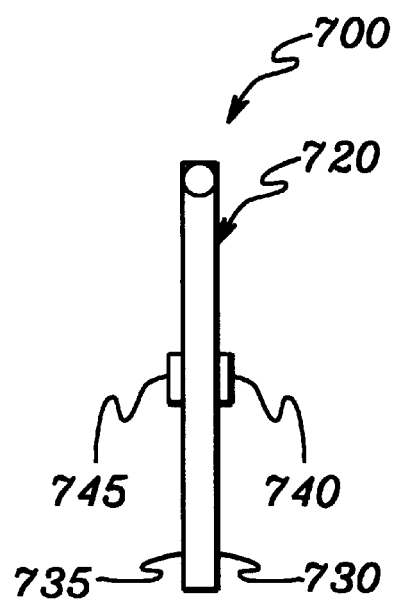
FIG. 7 is a view, similar to FIG. 3, of a mirror shown in FIG. 6.

Also, in this illustrated embodiment, each mirror 700 of the plurality of mirrors 620 is controlled by one of a plurality of controllers 650 for redirecting an incoming optical signal, as explained in greater detail below. Alternatively, a single controller may be employed for controlling the plurality of mirrors. As best illustrated in FIG. 7, mirror 700 may include a reflective member 720 having a reflective side 730, and a first optical sensor 740 disposed on reflective side 730 and a second optical sensor 745 disposed on an opposite side 735 of reflective member 720.

In operation of this optical switch, an optical signal may include a plurality of optical switching signals SW. For example, the first switching signal is used (e.g., detected by the optical sensor, processed in a controller which triggers a respective drive means) for orienting the first encountered mirror, the second switching signal is used (e.g., detected by the optical sensor, processed in a controller which triggers a respective drive means) for orienting the second encountered mirror, the third switching signal is used (e.g., detected by the optical sensor, processed in a controller which triggers a respective drive means) for orienting the third encountered mirror, and so on. In this illustrated embodiment, the first switching signal results in the first encountered mirror being oriented in a first orientation (e.g., vertical orientation), the second switching signal results in the second encountered mirror being oriented in a first orientation (e.g., vertical orientation), the third switching signal results in the third encountered mirror being maintained in the biased orientation (e.g., 45-degree orientation), and the fourth and fifth switching signals which are detected on the back side of the fourth and fifth encountered mirrors resulting in them being oriented in a second orientation (e.g., horizontal orientation). Thereafter, a data portion DS of an optical signal transmitted via optical fiber b is redirected to optical fiber g. Desirably, the switching signals may include information regarding the amount of time a mirror is to be disposed in a desired orientation, so that thereafter the controller and drive means returns the mirror to its biased or initial orientation.

Figure 8:
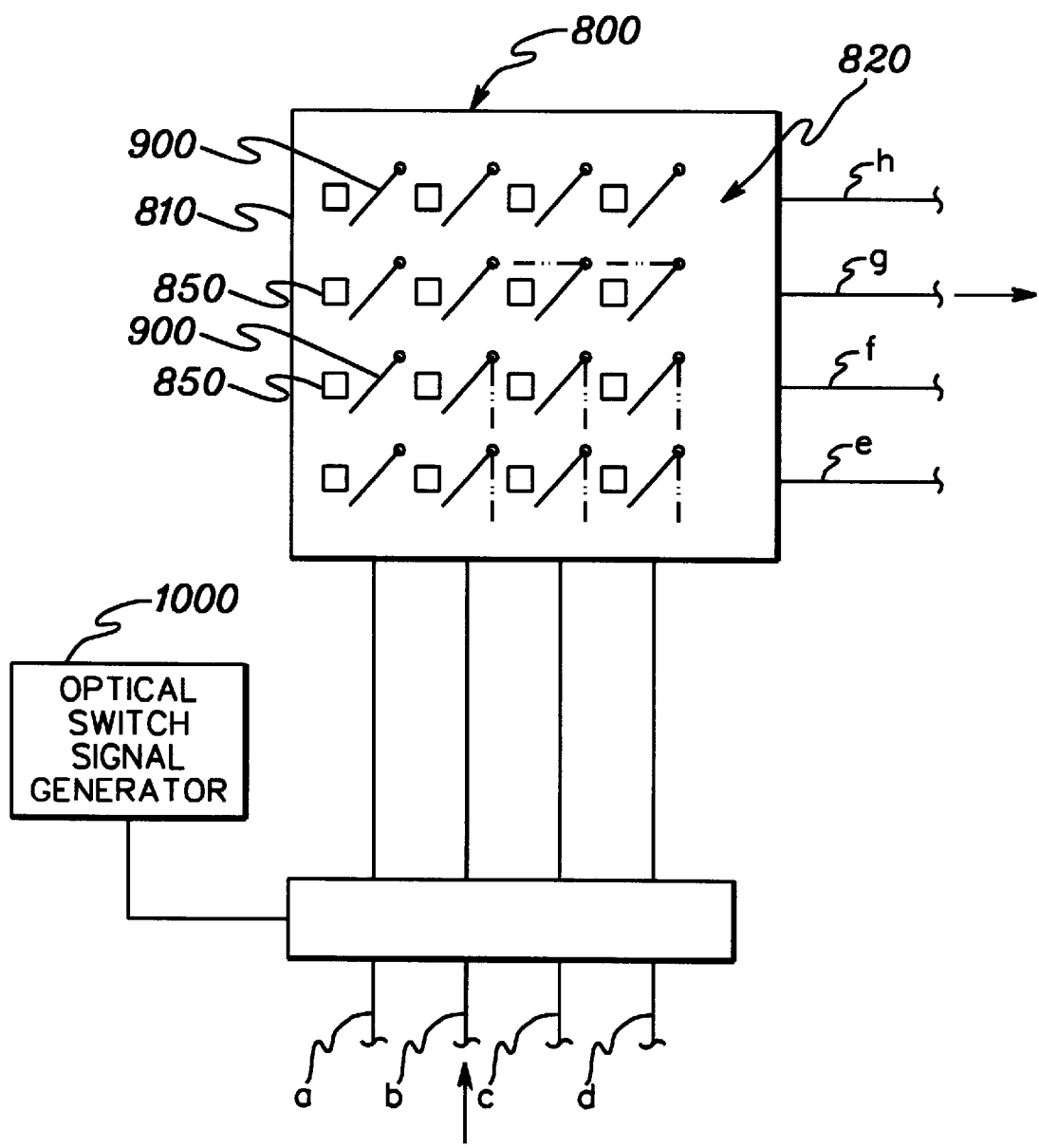
FIG. 8 is a schematic diagram of another embodiment of an optical switch according to the present invention.

FIG. 8 illustrates another embodiment of an optical switch 800 according to the present invention for redirecting an optical signal. Optical switch 800 generally comprises a housing 810 in which is supported a plurality of spaced-apart mirrors 820 disposed in an array for detecting and reflecting one or more optical signals. Housing 810 and the plurality of mirrors 820 are desirably formed using MEMS technology, and include drive means as discussed above.

In this illustrated embodiment, each mirror 900 of the plurality of mirrors 820 is controlled by one of a plurality of controllers 850 for redirecting an incoming optical signal, as explained in greater detail below. Alternatively, a single controller may be employed for controlling the plurality of mirrors. Mirror 900 may include a reflective member having a reflective side facing the incoming optical signal, and an optical sensor disposed on the reflective side.

Figure 9:
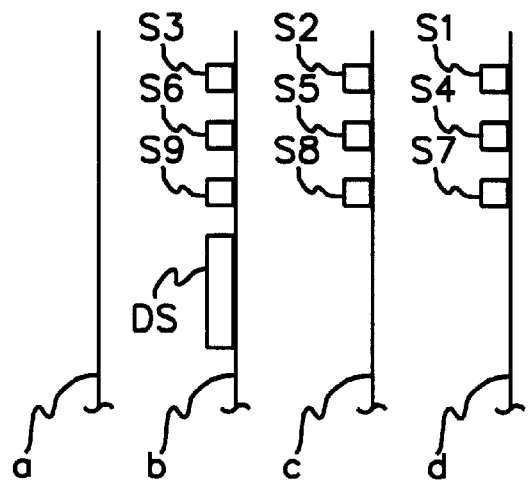
FIG. 9 is a diagrammatic illustration of optical switching signals for controlling the orientation of certain mirrors in FIG. 8 for redirecting an optical signal.

With reference to FIGS. 8 and 9, an optical switch signal generator 1000 desirably provides a plurality of switching signals for controlling the orientation of several of mirrors 900 to redirect an optical signal. For example, optical switch signal generator 1000 may provide one or more optical switching signals via optical fibers a, b, c, and d, prior to transmission of a data portion DS of an optical signal. In this illustrated example, a first set of switching signals, e.g., S1, S2, and S3, initially results (e.g., detected by the optical sensor, processed in a controller which triggers a respective drive means) in three of the first row of mirrors 900 being oriented in a first orientation (e.g., vertically disposed orientation as shown in phantom in FIG. 8) thereby allowing passage of a second set of switching signals, e.g., S4, S5, and S6. The second set of switching signals S4, S5, and S6 results (e.g., detected by the optical sensor, processed in a controller which triggers a respective drive means) in three of the second row of mirrors 900 being oriented in a first orientation (e.g., vertically disposed orientation as shown in phantom in FIG. 8) thereby allowing passage of a third set of switching signals, e.g., S7, S8, and S9. The third set of switching signals results (e.g., detected by the optical sensor, processed in a controller which triggers a respective drive means) in the mirror which detects switching signal S9 maintaining its biased orientation (e.g., 45-degree orientation), and the mirrors encountering switching signals S8 and S9 being disposed in a second orientation (e.g., horizontally disposed orientation as shown in phantom in FIG. 8). Thereafter, a data portion of an optical signal transmitted via optical fiber b is redirected to optical fiber g. Desirably, the switching signals may include information regarding the amount of time a mirror is to be disposed in a desired orientation, so that thereafter the controller and drive means returns the mirror to its biased or initial orientation.

From the present description, it will be appreciated by those skilled in the art that other configurations for the reflective member, the sensor, and the drive means may also be suitably employed. It will also be appreciated that the reflective member may be movable over other ranges of angles for suitably redirecting an optical signal. From the present description, it will also be appreciated by those skilled in the art that various combinations of the various aspects of the disclosed embodiments may be combined in further mirrors and optical switches for redirecting an optical signal according to the present invention.

Thus, while various embodiments of the present invention have been illustrated and described, it will be appreciated to those skilled in the art that many changes and modifications may be made thereunto without departing from the spirit and scope of the invention.

What is claimed is:

1. A mirror for use in an optical switch for redirecting an optical signal, said mirror comprising:

a reflective member for reflecting the optical signal;

an optical sensor for detecting the optical signal; and wherein said optical sensor comprises a first optical sensor disposed on a first side of said reflective member and a second optical sensor disposed on a second side of said reflective member.

2. The mirror of claim 1 wherein said optical sensor comprises a photodiode.

3. The mirror of claim 1 wherein said optical sensor is attached to said reflective member.

4. The mirror of claim 1 wherein said reflective member comprises a reflective side and said optical sensor is disposed on a portion of said reflective side.

5. The mirror of claim 1 wherein said reflective member comprises a reflective side and said optical sensor is disposed on substantially the entire reflective side of said reflective member.

6. The mirror of claim 1 wherein said reflective member and said optical sensor are integrally formed as one-piece.

7. The mirror of claim 1 wherein said reflective member and said optical sensor are fabricated as part of a micro-electro-mechanical system.

8. An optical switch for redirecting an optical signal, said optical switch comprising:

a plurality of mirrors of claim 1 disposed in an array.

9. An optical switch for redirecting an optical signal to at least one of a plurality of outputs, said optical switch comprising:

a mirror comprising a reflective member for reflecting the optical signal and an optical sensor attached to the reflective member for detecting the optical signal; and drive means for moving said mirror in one of a plurality of positions based on the detected optical signal to redirect the optical signal to one of the plurality of outputs.

10. The optical switch of claim 9 wherein said drive means is operable to move said reflective member in one of a plurality of positions based on an address portion of the optical signal.

11. The optical switch of claim 9 further comprising a generator for providing an optical switching signal portion of the optical signal, and wherein said drive means is operable to move said reflective member in one of the plurality of positions based on the optical switching signal.

12. The optical switch of claim 9 wherein said drive means comprises at least one of electrostatic drive means, optical drive means, magnetic drive means, mechanical drive means, and combinations thereof.

13. The optical switch of claim 9 wherein said optical sensor comprises a photodiode.

14. The optical switch of claim 9 wherein said reflective member comprises a reflective side and said optical sensor is disposed on a portion of said reflective side.

15. The optical switch of claim 9 wherein said reflective member comprises a reflective side and said optical sensor is disposed on substantially the entire reflective side of said reflective member.

16. The optical switch of claim 9 wherein said optical sensor comprises a first optical sensor disposed on a first side of said reflective member and a second optical sensor disposed on a second side of said reflective member.

17. The optical switch of claim 9 wherein said reflective member and said optical sensor are integrally formed as one-piece.

18. The optical switch of claim 9 wherein said reflective member and said optical sensor are fabricated as part of a micro-electro-mechanical system.

19. The optical switch of claim 9 wherein said optical switch comprises an array of a plurality of said mirrors, and a plurality of drive means each corresponding to one of the plurality of said mirrors for moving said plurality of said mirrors in one of a plurality of positions based on the optical signal to redirect the optical signal to one of the plurality of outputs.

20. The optical switch of claim 19 wherein said array of said plurality of mirrors and said plurality of said drive means are fabricated as part of a micro-electro-mechanical system.

21. The optical switch of claim 17 wherein said optical sensor comprises a photodiode.

22. A method for redirecting an optical signal to at least one of a plurality of outputs, the method comprising:

receiving the optical signal from at least one input;

providing a mirror comprising a reflective member and an optical sensor attached to the reflective member;

detecting the optical signal using the optical sensor; and moving the mirror in one of a plurality of positions based on the detected optical signal to redirect the optical signal to one of the plurality of outputs.

23. The method of claim 22 wherein providing the mirror comprises integrally forming the reflective member and the optical sensor as one piece.

24. The method of claim 22 wherein the optical signal comprises an address portion, the detecting the optical signal comprises detecting the address portion, and the moving comprises moving the mirror in one of the plurality of positions based on the detected address portion to redirect the optical signal to one of the plurality of outputs.

25. The method of claim 22 wherein the optical signal comprises an optical switching signal, the detecting the optical signal comprises detecting the optical switching signal, and the moving comprises moving the mirror in one of the plurality of positions based on the detected optical switching signal to redirect the optical signal to one of the plurality of outputs.

26. The method of claim 22 further comprising generating an optical switching signal, and wherein the receiving comprises receiving the optical switching signal and the optical signal, the detecting the optical signal comprises detecting the optical switching signal, and the moving comprises moving the mirror in one of the plurality of positions based on the detected optical switching signal to redirect the optical signal to one of the plurality of outputs.

27. The method of claim 22 wherein the providing the mirror comprises providing a plurality of mirrors, and the moving comprises moving at least some of the plurality of mirrors in one of the plurality of positions based on the detected optical signal to redirect the optical signal to one of the plurality of outputs.

* * * * *